United States Patent
Thoppae et al.

(10) Patent No.: US 9,432,347 B2
(45) Date of Patent: Aug. 30, 2016

(54) SECURE DESKTOP INTERFACE

(75) Inventors: Vijai M. Thoppae, Canton, MI (US);
Matt Toburen, Byron Center, MI (US);
Gordon Sanders, Rochester Hills, MI (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 314 days.

(21) Appl. No.: 12/886,057

(22) Filed: Sep. 20, 2010

(65) Prior Publication Data
US 2012/0072858 A1    Mar. 22, 2012

(51) Int. Cl.
*G06F 3/00* (2006.01)
*H04L 29/06* (2006.01)
*H04L 29/08* (2006.01)

(52) U.S. Cl.
CPC ............ *H04L 63/08* (2013.01); *H04L 63/105* (2013.01); *H04L 67/125* (2013.01)

(58) Field of Classification Search
CPC ..................................................... H04L 63/08
USPC .................................. 715/763, 741, 742, 743
See application file for complete search history.

(56) References Cited

U.S. PATENT DOCUMENTS

| | | | | |
|---|---|---|---|---|
| 6,151,493 A * | 11/2000 | Sasakura et al. | ............ | 455/421 |
| 6,594,579 B1 * | 7/2003 | Lowrey et al. | ............... | 701/123 |
| 7,627,334 B2 * | 12/2009 | Cohen et al. | ............... | 455/456.3 |
| 2003/0020759 A1 * | 1/2003 | Cancilla et al. | ............... | 345/810 |
| 2003/0103088 A1 * | 6/2003 | Dresti et al. | ................. | 345/835 |

* cited by examiner

*Primary Examiner* — Andrey Belousov
(74) *Attorney, Agent, or Firm* — Baker Hostetler LLP (57) ABSTRACT

An apparatus and system for providing a secure user interface restricting the access of users to selected functions, files, and communications by implementing a customizable secure graphical user interface. The degree to which the user's access is restricted may depended on levels of authorization granted to the user. The secure user interface may be implemented on a device and employed to aid a user in executing diagnostic, service, maintenance, and data gathering tasks. The secure computing device may be connectable to other computing devices of like of different kind. The secure computing device may provide security against non-authorized users by requiring user identification and disabling the device when proper identification is not given or the device is deemed missing.

20 Claims, 8 Drawing Sheets

SECURE DESKTOP INTERFACE

FIELD OF THE INVENTION

The present invention relates generally to providing a computing device user interface for controlling access to selected computer functionalities and software programs, secured communications between computerized devices, and an optionally customizable graphical user interface.

BACKGROUND OF THE INVENTION

Computing devices implemented as tools very often employ software stored on the computing device, such as in a form of nonvolatile memory. Developers and manufactures of the computing devices and the software stored and implemented thereon are often concerned with protecting proprietary information contained within the computing devices. Such computing devices may include, for example, diagnostic tools, calibration tools, information analysis tools, etc., for a variety of fields and industries, for example, individual vehicle or fleet service and maintenance, medical or scientific practice or research, etc. Well executed software may provide competitive advantages for a manufacturer or developer over competitors by offering more user friendly or more powerful functionality. Information gathered during the use of such computing devices may provide users with a competitive advantage in the field in which the computing device is used. Thus, the software and information implemented and stored on the computing device may be of great value Software and information do not have to reside on one of these computing devices to provide competitive advantages and value, it may also be transferred, or transmitted, from one computing device to another computing device, either of the same kind or of a different kind.

When such a computing device is embodied as a mobile device, a further concern, which is not exclusive to mobile devices, but becomes heightened, is that a computing device containing valuable and proprietary information may be lost or stolen.

The concerns and needs for different users and fields of use for such a computing device may vary greatly with respect to the information and software used by or stored on the computing device.

Therefore, it is desirable to have a secure computing device or secure computing system that may secure, or protect, the software and information from access by non-authorized parties to preserve competitive advantages and value; secure, or protect, communications between computing devices so as not to allow those not authorized to gain access to valuable and proprietary information; control the storage of software and information when a non-authorized user is using or in possession of the secure computing device; and customize levels of access, and the look and feel of the user interface.

SUMMARY OF THE INVENTION

At least in view of the above, it would be desirable to provide a system for connecting a high voltage electricity source to an electric vehicle to recharge its batteries. The foregoing needs are met, to a great extent, by certain embodiments of the present invention. According to one such embodiment of the present invention, a system for securing information accessible via a computing device may include, a memory which stores instructions for providing a customizable user interface capable of granting and restricting access to stored information and executable functions via verifying a user identification; a processor connected to the memory and capable of receiving and executing the instructions; an input connected to the processor and capable of providing signals to the processor, where the signals represent the user identification; and a display connected to the processor and for displaying the customizable user interface.

In yet another embodiment, a method for securing information accessible via a computing device may include displaying a customizable graphical user interface on a display; receiving an instruction to prompt for a user identification at a processor from a memory; receiving the user identification via an input; verifying the user identification via the processor; determining a level of access associated with the user identification via the processor; and granting access according to the level of access associated with the user identification via the processor.

In still another embodiment, a system for securing information accessible via a computing device may include a means for storing instructions for providing a customizable user interface capable of granting and restricting access to stored information and executable functions via verifying a user identification; a means for processing the instructions communicatively connected to the means for storing; a means for inputting signals to the means for processing, wherein the signals may represent the user identification; and a means for displaying the customizable user interface communicatively connected to the means for processing.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

An embodiment of the present inventive system for providing a secure user interface may include an apparatus, such as a secure computing device. The secure computing device may be employed to aid a user in executing diagnostic, service, maintenance, and data gathering tasks. The secure computing device may be connectable to other computing devices of like or different kind. The secure computing device may also restrict a user's access to certain functionalities, software files, and communications between computing devices. The degree to which the secure computing device restricts the user's access may depend on levels of authorization granted to the user by the manufacturer, distributor or owner.

Figure 1:
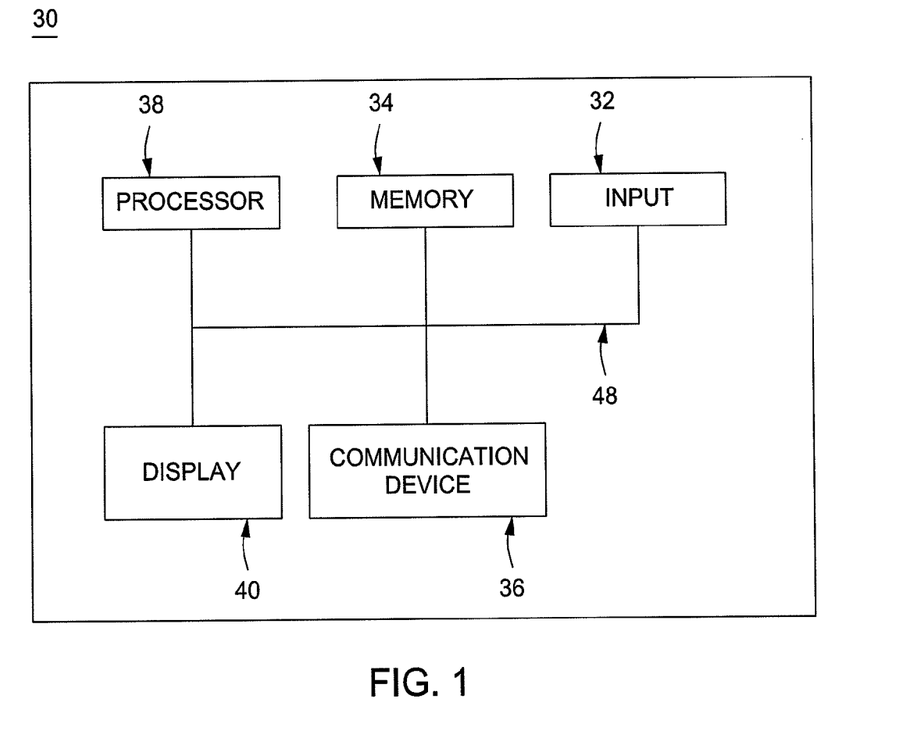
FIG. 1 is a block diagram view of an apparatus for providing a secure user interface according to an embodiment of the invention.

The invention will now be described with reference to the drawing figures, in which like reference numerals refer to like parts throughout. FIG. 1 is a block diagram view of an apparatus for providing a secure user interface according to an embodiment of the invention. A secure computing device 30 is one such apparatus and may include an input device 32, a memory 34, a communication device 36, a processor 38, and a display 40, some or all of which can be interconnected by a data link 48. The computing 30 can be a general computing device, such as a personal computer (PC), a UNIX workstation, a laptop, a tablet PC, a server, a mainframe computer, a personal digital assistant (PDA), a cellular phone, a smartphone, some combination of these or any other suitable computing device. Alternatively, the secure computing device 30 can be a specialized computing device made up of components specifically chosen to execute the functionality of the secure computing device 30, such as a diagnostic tool. The diagnostic tool can diagnose issues such as those that are medically related or vehicle related. The remaining components can include programming code, such as source code, object code or executable code, stored on a computer-readable medium that can be loaded into the memory 34 and processed by the processor 38 in order to perform the desired functions of the secure computing device 30.

The processor 38 may be executed in different ways for different embodiments of the secure computing device 30. One embodiment is that the processor 38 is a device that can read and process data such as a program instruction stored in the memory 34 or received from a remote device 50 (FIG. 2), such as a server. Such a processor 38 may be embodied, for example, by a microprocessor, a microcontroller, or a programmable logic device. On the other hand, the processor 38 may be a collection of electrical circuitry components built to interpret certain electrical signals and perform certain tasks in response to those signals, or an integrated circuit.

The memory 34 may include, for example, any form or combination of volatile, non-volatile, solid state, magnetic, optical, permanent, removable, writable, rewriteable, and read-only memory. The memory 34 may contain a number of program instructions for use with the secure computing device 30. The instructions may include methods, for example, for controlling the access of a user to certain files and functionalities stored on the memory 34.

Further, the memory may contain software having instructions related to diagnosing vehicle functions, such as OBD-II, battery testing, tire pressure sensor testing, emissions testing and the like. Additionally, the memory includes various communication protocols that the computing device may use to communicate with the apparatus under test. For example, communication protocols such as Controller Area Network (CAN), J1850 VPM and PWM, ISO 9141, Keyword 2000 and others. Further, the software may include the ability to track the status of various batteries in the vehicles, such as which batteries have been replaced, the remaining battery life of the various batteries, the warranty information about the batteries, the type of batteries used in the vehicle (mix and match) and the like. Many other embodiments may provide for further methods, some of which will be discussed herein.

Additionally, an embodiment of the secure computing device 30 can communicate information to a user through the display 40 and request user input through the input device 32 by way of an interactive, menu-driven, visual display-based user interface, or graphical user interface (GUI). The user may interactively input information using direct manipulation of the GUI. Direct manipulation can include the use of a pointing device, such as a mouse or a stylus, to select from a variety of selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of a mouse or buttons or keys, including for example, a trackball, a scroll wheel, a touch screen or a voice-activated system. The input devices 32 may have specified functions associated with them. For example, there may be a button, or other input device 32, that is dedicated for locking the secure computing device 30 so that a user has to provide identification to be able to use the secure computing device 30. Other functions may include displaying a keyboard on a touchscreen display, synchronizing secure computing device 30 with a remote device 50 (FIG. 2), etc. Other input devices 32 may be assignable, such as a softkey. The assignment of functions to the assignable input device 32 may rely on the level of access granted to a user, or the purpose for which a user is granted access to the secure computing device 30.

Figure 3:
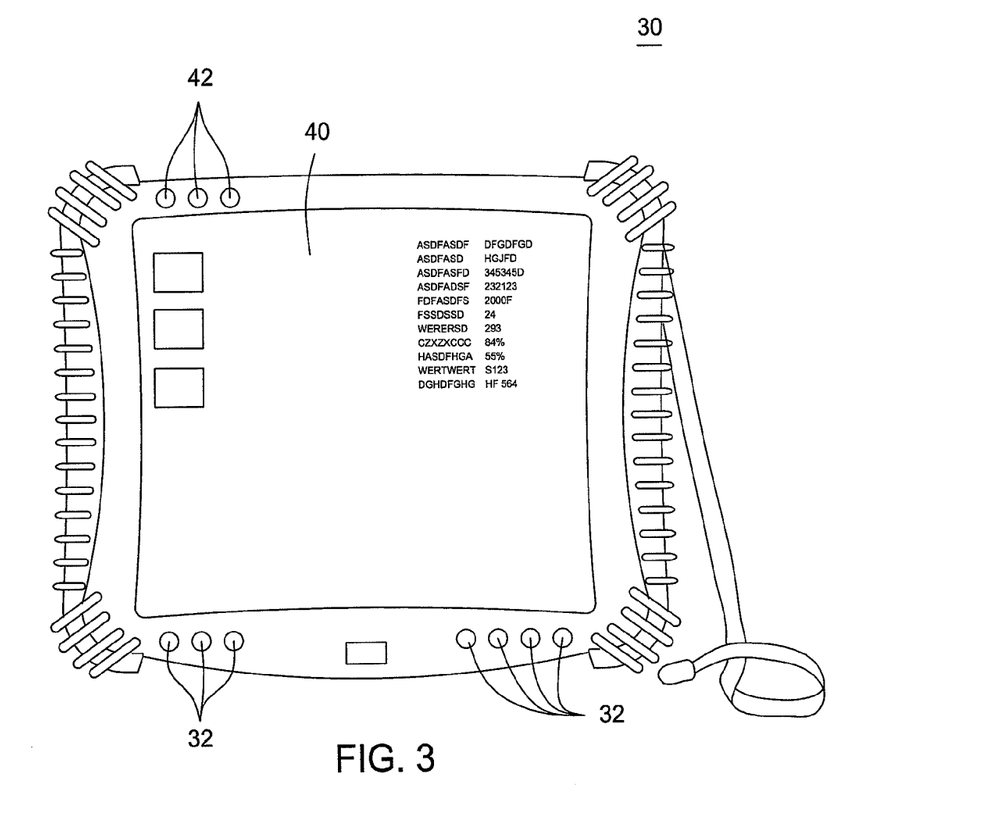
FIG. 3 is an elevation view of an apparatus for providing a secure user interface according to an embodiment of the invention.

The display 40 may further include an indicator(s) 42 (FIG. 3). Such indicators 42 may consist of a single or multiple light emitting diodes (LED). This implementation could work for transmitting a limited number of simple messages. An LED may emit a single color of light, or it may be able to emit a number of different colors. Each LED or color may be associated with a different message. Some messages may include that the power level of the batteries, that charging of the batteries is in progress, that the charging is complete. Other messages may relate to a wireless signal connection, indicating the strength of the signal. Still other LEDs may indicate that the secure computing device is in "locked down" mode or is "unlocked."

The GUI, as shown in FIGS. 3-6, may be customizable for individual applications. In some instances the operating system running on the secure computing device 30 may have a default GUI, such as with varying versions of Microsoft Windows, the various Apple Mac operating systems, and variants of Unix and Unix-like based operating systems. Some embodiments of the secure computing device 30 may include running a customized shell for the existing GUI. The shell allows for control of the look of the GUI, allowing for the application of branding of the software and/or the secure computing device 30, and control of user access to programs and files through the GUI. Such branding may be applied by providing a display background with a corporate logo or name. The customizability of the GUI may extend to the display of certain information. For different applications of the secure computing device 30, information may be displayed textually and/or graphically to the user based on the design of the GUI. The information may be available constantly, periodically, on demand, or when triggered by an event. Such information may include, but is not limited to: computer name; serial number; battery level; date; time; software and/or hardware version; wireless network status; wireless signal strength; IP address; and any messages.

Control of user access through the GUI can be administered on a user by user basis. Each user may have identification, such as a username and password that allows the user access to features of the secure computing device 30. For example, a user may be a technician who uses the device to perform jobs and requires access to functions and information that allow the technician to complete the jobs. In such an instance, the technician may be granted access to certain or all information and functions that may be accessed and run via the secure computing device 30. Alternatively, a user may be an information technology professional who is tasked with maintaining the secure computing device 30. In this instance, the information technology professional, may be granted access to menus and options that control the settings of the secure computing device 30, the professional may also be allowed to transfer information to and from the secure computing device 30, and install and remove software from secure computing device 30.

In other embodiments, the user access may be controlled by means other than username and password. Some implementations may include biometric security, like finger print scanners, DNA, and retina scans. Other security features may include passwords that are provided only after certain security questions are answered, randomized identification character strings, or access is granted by swiping a security card. Still, other embodiments may have accessible levels that allow access to all users without the need for identification. As in the example of the technician user above, it may not be necessary to secure the basic functionalities of the secure computing device 30. Thus, users like the technician, may be allowed to use the secure computing device 30 to execute jobs without having to be granted access while still being restricted from accessing more sensitive information.

Implementations of the user identification for determining access on the secure computing device 30 may vary. In one embodiment access may be determined by requiring the user to provide identification once before being able to access all functionality and information the user has permission to access, such as in a login screen. In such an instance, the user may only be presented with items, such as icons for executing software programs or opening information files that the user has been granted access to user, and all other items are hidden. See FIG. 3. Alternatively, the other items may be displayed to the user differently, such as shaded or grayed out, or in a different color. If the user attempts to access an item that the user has not been given permission to access, the secure computing device 30 may deny the user access, optionally displaying a message alerting to the user that access has been denied. Alternatively, the user may be prompted to provide an identification to check if the user has further access to the selected item.

Another embodiment may not initially require the user to provide identification, such as in a login screen, but may require user identification for access to individual items on the secure computing device 30. Each time the user attempts to access an item, the user may be prompted by a notification to provide their identification to determine if the user may be granted access to the selected item.

Also, as discussed above, there may be items that do not require specific access. A user may be free to access certain items without providing identification. These items may be visually distinct from items that do require identification for access. The items may be grouped separately, for example in separate menus that indicate whether the items do or do not require user identification, and potentially identifying a level of required access. The items may also be distinguished by size, shape, color, etc.

Figure 8:
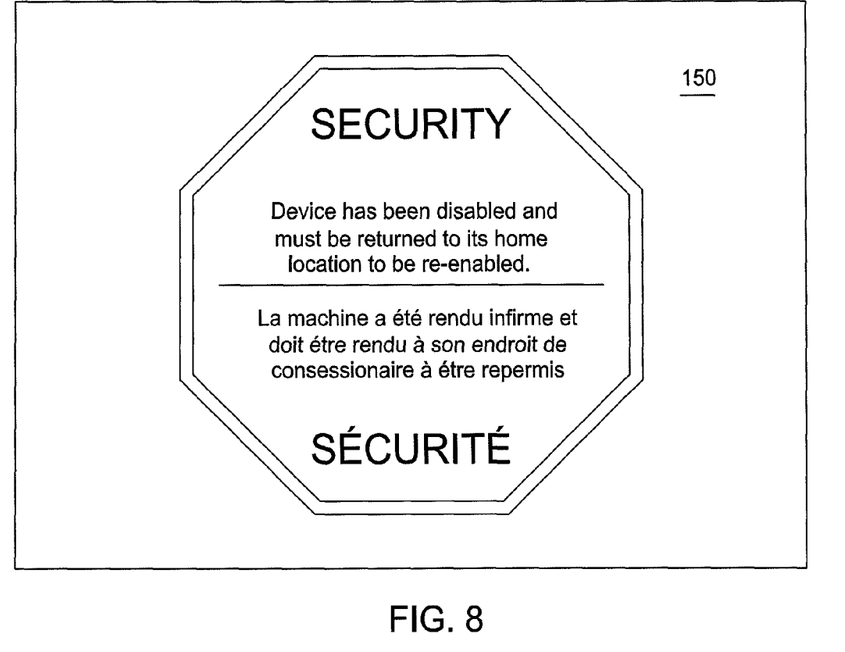
FIG. 8 is an exemplary screen view of a security message displayed by a secure user interface according to an embodiment of the invention.

A further level of security on the secure computing device 30 may include a mode where if a user, or more specifically a non-authorized user, attempts to access features and information via the secure computing device 30 and fails to provide the correct identifying information for an authorized user (for a certain period of time or for a number of predetermined times, etc.), then the secure computing device 30 may lock the user out of all interaction with the secure computing device 30. In such an instance, the secure computing device 30 may also shutdown and not turn back on, or brick, for a specified time, or until the secure computing device 30 is provided with some indication that it is then being used by an authorized user. Such means could include a signal transmitted via a wired or wireless means (such as sent by a manufacturer after the manufacturer has been contacted by an authorized user), certain combination of inputs, or an input via a means only accessed through a locked compartment. The lockout or bricking security feature may also be initiated remotely from a remote device 50 (FIG. 2), either manually or automatically. For instance, a user may report a secure computing device 30 lost or stolen, or via a tracking means it may be determined that the secure computing device 30 has left a specified area, then either by automatic or manual means the secure computing device 30 may be locked out or bricked. In the instance where a tracking means is employed, it may be embodied via an electronic component within the secure computing device 30, such as an radio frequency transceiver, that periodically or continuously broadcasts or is polled to determine if the secure computing device 30 is within an electronic perimeter. Another embodiment may be to periodically or continuously check or receive confirmation that the secure computing device 30 is connected to a specific network. If the secure computing device leaves a specified area, it can automatically shut down and a signal may be sent to the service shop supervisor or other authorized user, and the manufacturer so that the appropriate steps may be taken. If any of the above security features are enabled, the user of the secure computing device 30 may be alerted that it had been disabled via and audible or visual indicator. In some instances the audible indicator be a spoken message or an alarm tone. The visual indicator may be the LED light 42 (FIG. 3) of the secure computing device 30 or a message 150 (FIG. 8) on the display 40.

Figure 2:
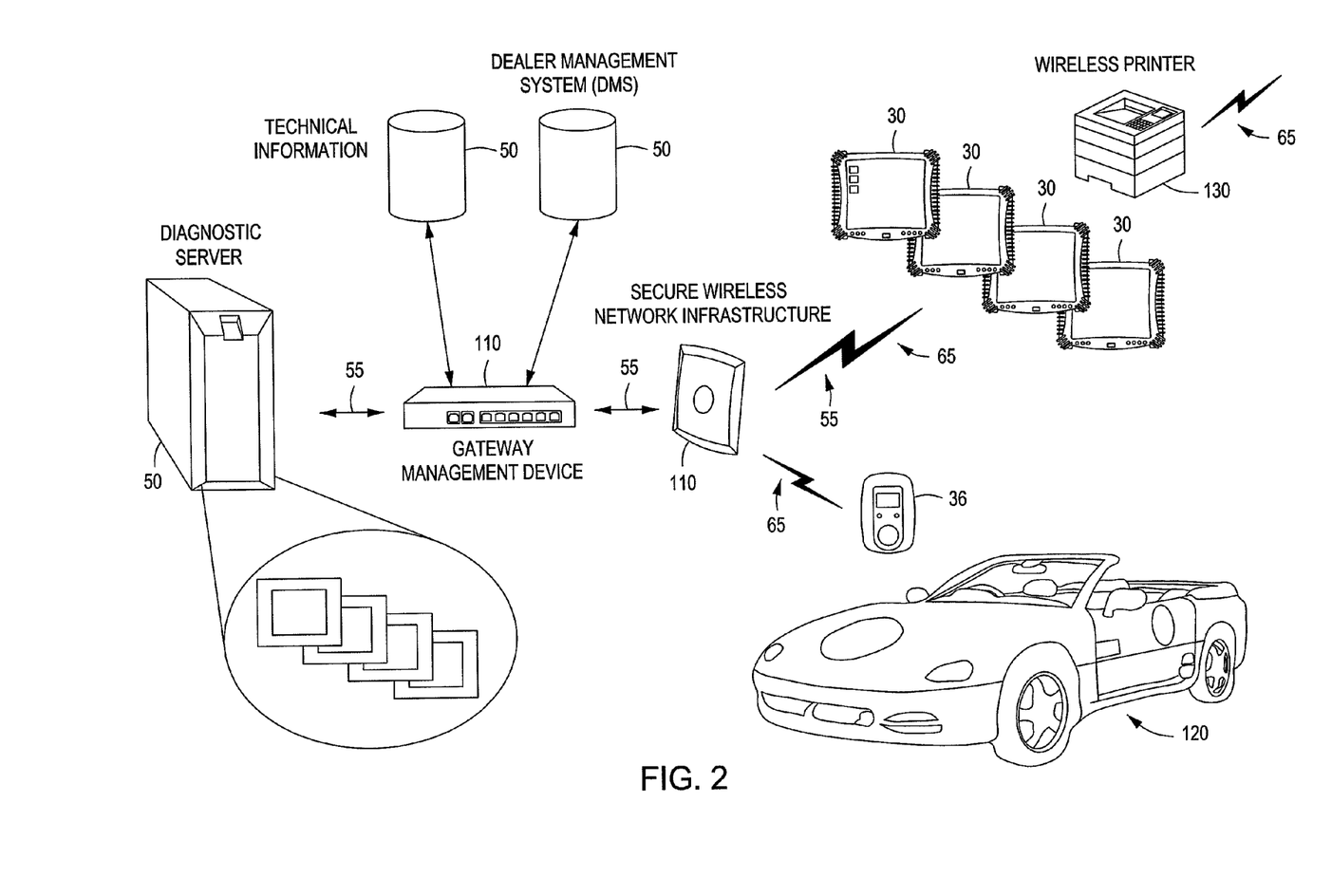
FIG. 2 is a schematic view of a system for providing a secure user interface on a device connected to a remote device and a subject device according to an embodiment of the invention.

Referring to FIG. 2, in various embodiments, the secure computing device 30 can be coupled to a communication network 55. The communication network allows for communication between the secure computing device 30 and a remote device 50. The secure computing device 30 can be coupled to the communication network by way of the communication device 36 (FIG. 1) which in various embodiments can incorporate any combination of devices—as well as any associated software or firmware—configured to couple processor-based systems. Such communication devices 36 (FIG. 1) may include modems, network interface cards, serial buses, parallel buses, LAN or WAN interfaces, wired, wireless or optical interfaces, and the like, along with any associated transmission protocols, as may be desired or required by the design.

The communication network links the communication device 36 (FIG. 1) of the secure computing device 30 with the remote device 50. Various embodiments of the communication network may include any viable combination of devices and systems capable of linking computer-based systems, such as USB; Bluetooth; WiFi; ZigBee; power line communication (PLC); home area network (HAN); Silver Spring network; stable election protocol (SEP); the Internet; TCP/IP; an intranet or extranet; a local area network (LAN); a wide area network (WAN); a direct cable connection; a private network; a public network; an Ethernet-based system; a token ring; a value-added network; a telephony-based system, including, for example, T1 or E1 devices; a cellular telephony system, for example, GPRS or GSM; an Asynchronous Transfer Mode (ATM) network; a wired system; a wireless system; an optical system; a combination of any number of distributed processing networks or systems or the like.

In an embodiment of the invention, the secure computing device 30 may connect to a vehicle 120. A communication device 36 may be connectable to the vehicle 120 or incorporated in the vehicle 120. The connection between the secure computing device 30 and the vehicle 120 may be implemented in any of the ways of connecting the secure computing device 30 to the remote computing device 50 described above.

Some networks may include and intermediary device 110. These intermediary devices 110 can be used to manage and direct the traffic on a network and provide network security. Intermediary devices 110 may also allow devices, such as the secure computing device 30, the remote computing device 50 and the vehicle 120, connect to other devices on a specific network, or connect to other networks and device connected to the other networks. In one embodiment the secure computing device 30 could connect to a printer 130, which may be wired or wireless. Some examples of such intermediary devices 70 may include, routers, access points, range expanders, network switches, gateways, modems, and servers.

Like the secure computing device 30, the remote device 50 can be a general computing device, such as a personal computer (PC), a UNIX workstation, a laptop, a tablet PC, a server, a mainframe computer, a personal digital assistant (PDA), a cellular phone, a smartphone, some combination of these or any other suitable computing device. Alternatively, the remote device 50 can be a specialized computing device made up of components specifically chosen to execute the functionality of the remote device 50.

As discussed above, some of the secure computing device's 30 security features may be executed by the remote device 50. Further, it is possible to manage any number of the security and functionality of the secure computing device 30 from the remote device 50. Some or all of the software that controls the security and functionality of the secure computing device 30 may be run on the remote device 50, or server side, and the resulting information may be displayed on the secure computing device 30 or signals may be passed through the secure computing device 30 between the remote device 50 and a subject device 60 (via connection 65, which may be similar to connection 55 described above). The subject device 60 may be any device which the secure computing device 30 may connect to, via means similar to which it connects to the remote device 50 or any means specific to the subject device 60, to execute tasks, such as diagnostic, service, maintenance, and data gathering tasks. Examples of a subject device may be a vehicle, like a car which may connect to the secure computing device 30 via OBD II connector, an HVAC system, or a medical device or sensor which may take readings from a patient.

The remote device 50 may also connect to the secure computing device 30 to provide software and information updates and maintenance. A remote device user may be able to push updates to one or multiple secure computing device 30. The remote device user may also be able to login to the secure computing device 30 remotely and control the secure computing device 30 from the remote device 50. This will allow a user, such as an information technology professional, to access the secure computing device settings and options from a remote location, and to provide troubleshooting and maintenance for the secure computing device 30 without having to be present physically.

A further security feature of the secure computing device 30 may be a limitation on external communication with other devices. It may be a feature that the secure computing device 30 be constructed or configured, either by hardware or software, to only receive communications from external devices such as the remote device 50 and/or the subject device 60. Such a limitation on external communication need not be complete however, allowing the secure computing device 30 to send instructions to the subject device 60 may be useful for extracting the desired information from the subject device 60. Thus, and embodiment may control the external communications of the secure computing device 30, limiting the communications to sending instructions to and receiving data from the subject device 60, and receiving information from the remote device 50.

In another embodiment, the communication between the secure computing device and a remote device may be scrambled or encrypted and requires the appropriate decryption keys in order for information to be exchanged. In still another embodiment, proprietary communication protocols may be used in order to ensure that only the authorized devices are allowed to communication with each other.

FIG. 3 displays an embodiment of the secure computing device 30. Shown on the display 40 of the secure computing device 30 is and exemplary display for a user with a certain level access allowed for a certain level of security.

Figure 4:
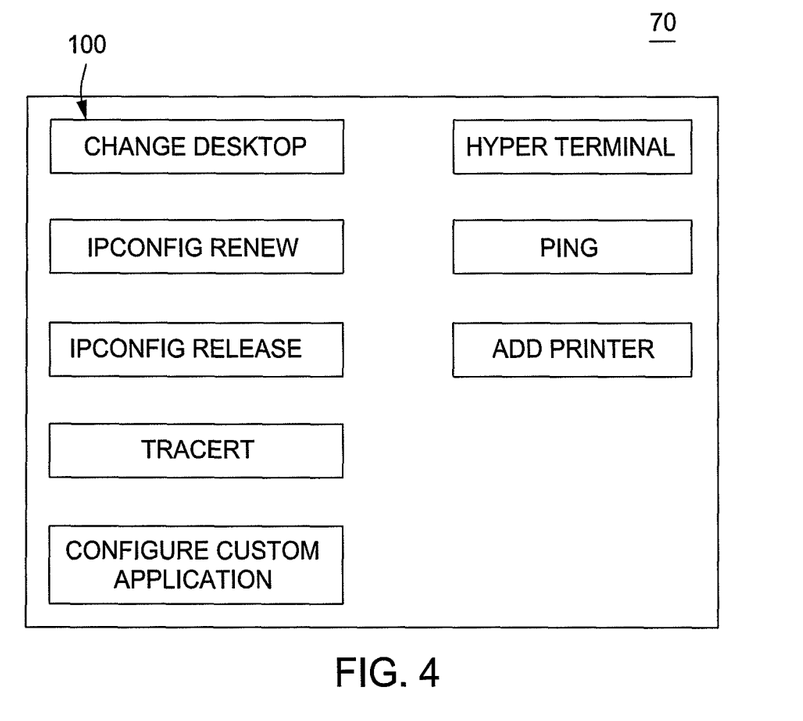
FIG. 4 is an exemplary screen view of a first level of access of a secure user interface according to an embodiment of the invention.
Figure 5:
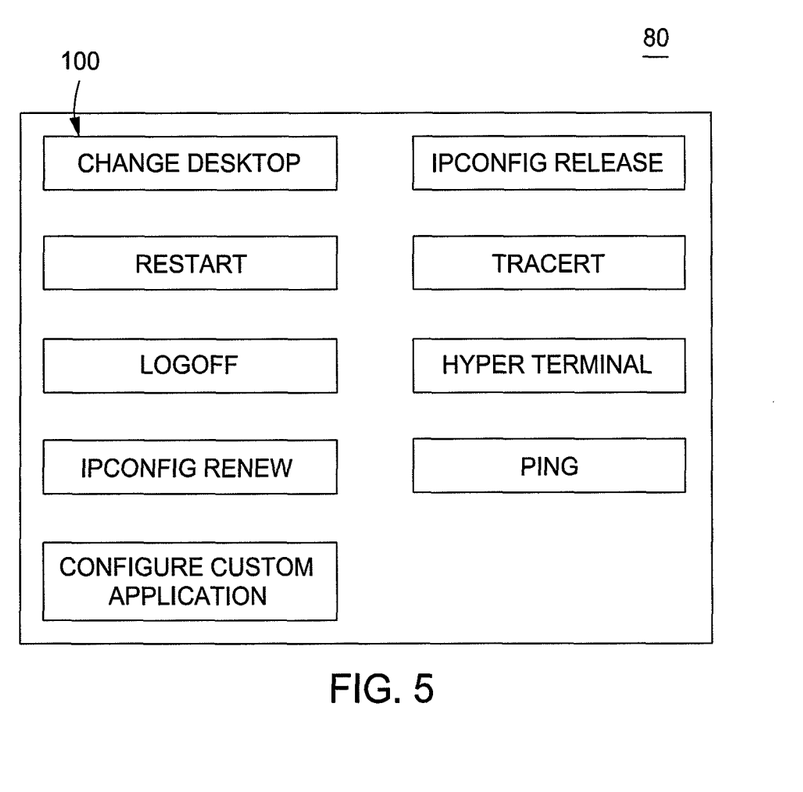
FIG. 5 is an exemplary screen view of a second level of access of a secure user interface according to an embodiment of the invention.
Figure 6:
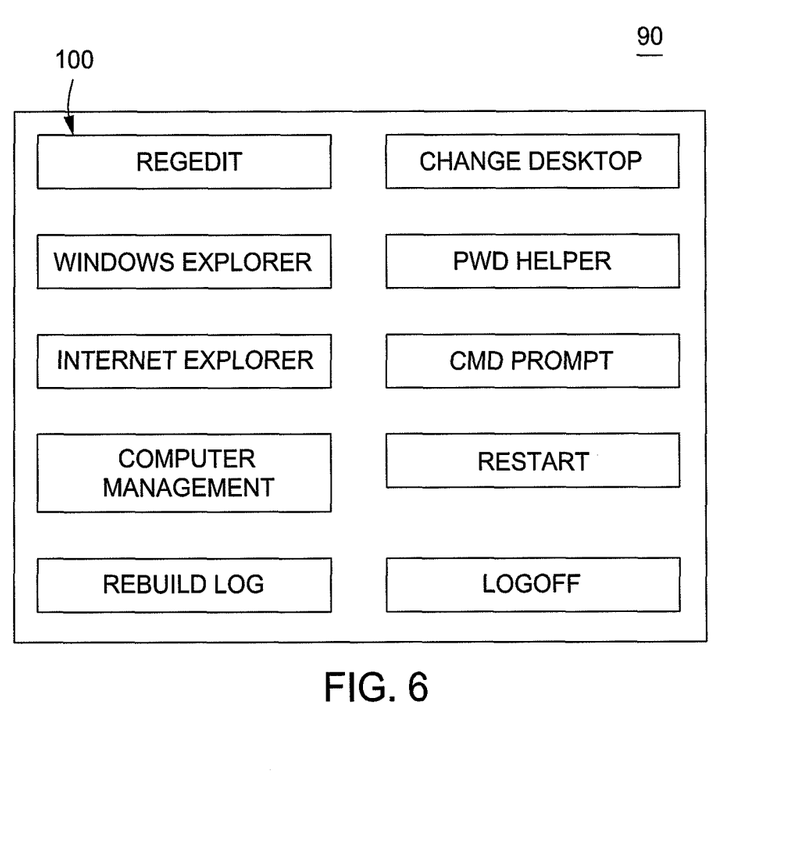
FIG. 6 is an exemplary screen view of a third level of access of a secure user interface according to an embodiment of the invention.

FIGS. 4-6 are exemplary screens displayed to users having different levels of access. FIG. 4 is an exemplary view of a screen 70 that may be displayed to a user with a first level of access. The items 100 displayed on the screen 70 are specific to the level of access granted to the user with the first level of access. FIG. 5 is an exemplary view of a screen 80 that may be displayed to a user with a second level of access.

Compared to FIG. 4, FIG. 5 shows a different set of items 100 for the user with the second level of access. Some of the items 100 available to the user with the first level of access may be available to the user with the second level of access, and some of the items 100 available to the user with the second level of access may be unique to the user with the specific access. FIG. 6 is an exemplary view of a screen 90 that may be displayed to a user with a third level of access. Comparison between FIG. 6 and FIGS. 4 and 5 is similar as to the comparison between FIGS. 4 and 5. The user with the third level of access may be displayed some or all of the items 100 presented to the users with a lower level of access, and the user may be displayed items 100 that are unique to the user's access level.

Figure 7:
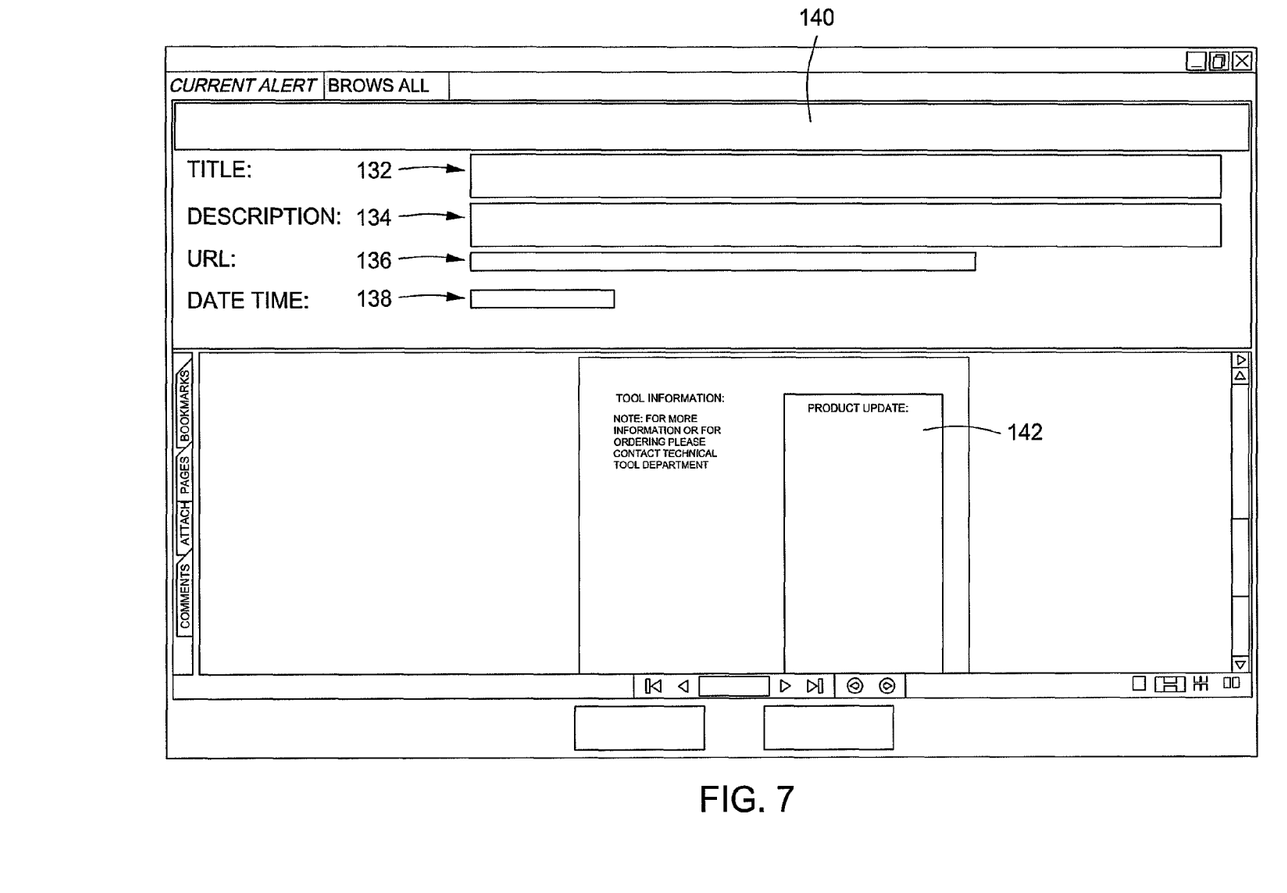
FIG. 7 is an exemplary screen view of a one-way message received by a device implementing a secure user interface according to an embodiment of the invention.

An implementation of the one-way communication between the secure computing device 30 and the remote device 50 may be to receive in the secure computing device 30 RSS feeds from the remote device 50. Other implementations may include one-way email, instant messaging, sms messaging, or the like. The communications received by the secure computing device 30 may also be associated with a indication of their importance, such as low, normal, or high. The communications may be sent to individual or a group of secure computing devices 30. The communications may also be tied to a specific or range of time and dates to send to the secure computing devices 30. An example of such a communication is illustrated in FIG. 7. The message 130 may include a title 132, a description 134, a URL 136, the date and time 138, a priority rating 140, and a body 142.

As may be seen in the above embodiments, not all of the information used has to be stored directly on the secure computing device 30. Some or all of the software and information may be provided by the remote computing device 50. In one embodiment there may be multiple remote computing devices 50. It is possible to have each of the remote computing devices 50 available for all of the same tasks as the other remote computing devices, or each remote computing device 50 may have a specific task associated with it. One such example, as shown in FIG. 2, may be to employ one remote computing device 50 to provide the software or functionality to the secure computing device 30, have another remote computing device 50 provide technical information on a subject related to the use of the secure computing device 30, and have a third remote computing device 50 to provide functionality to manage the secure computing devices 30, like the security features described herein.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A diagnostic computing device, the diagnostic computing device comprising:
    a memory configured to store instructions that provides a customizable graphical user interface capable of granting and restricting access to stored information on the memory and capable of executable functions based on a user identification based on a biometric of a user, the customizable graphical user interface sits on top of an operating system of the diagnostic computing device;
    the memory further configured to store instructions for executing at least one of diagnostic tasks, service tasks, maintenance tasks, or data gathering tasks and for executing a plurality of security features;
    a processor communicatively connected to the memory and configured to receive and execute the instructions;
    an assignable input communicatively connected to the processor and configured to provide signals to the processor, wherein the signals include the user identification; and
    a display communicatively connected to the processor and configured to display the customizable graphical user interface, wherein the customizable graphical user interface is configured to show icons that are available based on the user identification and a level of access assigned to the user identification and hide icons of programs associated with icons that are unavailable based on the user identification and the level of access assigned to the user identification,
    wherein the diagnostic computing device is configured to diagnose a vehicle related issue,
    wherein the diagnostic computing device is configured to limit external communication to receiving unidirectional communication including a signal from a remote device to lock out the user if verifying the user identification fails, and
    wherein the diagnostic computing device alerts the user of the diagnostic computing device if one of the plurality of security features of the diagnostic computing device has been disabled.

2. The system of claim 1, further comprising a communication device configured to connect the diagnostic computing device to the remote device via a network.

3. The system of claim 2, wherein the remote device further comprises a second memory, and the remote device is configured to provide the diagnostic computing device with the instructions from the second memory via the network.

4. The system of claim 2, wherein the remote device is a vehicle connected to the network via an OBD II connector.

5. The system of claim 1, wherein the display is configured to display a prompt to the user for the user identification.

6. The system of claim 1, wherein the user identification comprises a username and password.

7. The system of claim 1, wherein the instructions are configured to limit user access based on the access level assigned to individual users.

8. The system of claim 1, wherein the processor locks out the diagnostic computing device if the computing device is removed a predetermined distance from a network.

9. A method for securing information on a diagnostic computing device, the method comprising:
    displaying a customizable graphical user interface on a display, the customizable graphical user interface sits on top of an operating system of the diagnostic computing device;
    receiving an instruction from a memory to prompt for a user identification;
    receiving the user identification based on a biometric of the user via an assignable input;
    verifying the user identification via a processor;
    determining a level of access associated with the user identification via the processor;
    granting access according to the determined level of access associated with the user identification via the processor including showing icons that are available based on the user identification and the determined level of access assigned to the user identification;

configuring the display to hide icons of programs associated with icons that are unavailable based on the user identification and the determined level of access assigned to the user identification;

wherein a function of the assignable input relies on the level of access granted to a user, wherein the diagnostic computing device is configured to diagnose at least one of a medically related issue or a vehicle related issue including executing at least one of diagnostic tasks, service tasks, maintenance tasks, or data gathering tasks; and limiting the diagnostic computing device to receiving unidirectional communication that includes a signal from a remote device to lock out a user if verifying the user identification fails, and wherein the diagnostic computing device alerts the user of the diagnostic computing device if one of a plurality of security features of the diagnostic computing device has been disabled.

10. The method of claim 9, wherein receiving the instruction to prompt for the user identification occurs at a login screen.

11. The method of claim 9, wherein receiving the instruction to prompt for the user identification occurs in response to receiving a signal from the input.

12. The method of claim 9, further comprising:
receiving instructions via a network from the remote device.

13. The method of claim 9, further comprising:
shutting down the diagnostic computing device when verification fails.

14. The method of claim 9, further comprising restricting the diagnostic computing device to receiving communications via a network from the remote device.

15. The method of claim 9, further comprising:
locking the diagnostic computing device when the diagnostic computing device is a predetermined distance from the remote device.

16. The method of claim 9, further comprising:
displaying items according to the determined level of access associated with the user identification.

17. The method of claim 9, wherein verifying the user identification further comprises verifying the biometric information.

18. The method of claim 9, further comprising:
detecting a connection to a given network; and shutting down the diagnostic computing device if the given network is not detected.

19. A diagnostic computing device, the system comprising:

means for storing configured to store instructions for providing a customizable graphical user interface capable of granting and restricting access to stored information on the means for storing and executable functions based on a user identification based on a biometric of a user, the customizable graphical user interface sits on top of an operating system of the diagnostic computing device;

the means for storing further configured to store instructions for executing at least one of diagnostic tasks, service tasks, maintenance tasks, or data gathering tasks and instructions for executing a plurality of security features;

means for processing communicatively connected to the means for storing and configured to receive and execute the instructions;

means for inputting communicatively connected to the means for processing and configured to provide signals to the means for processing, wherein the signals include the user identification; and means for displaying communicatively connected to the means for processing and configured to display the customizable graphical user interface, wherein the customizable graphical user interface is configured to show icons that are available based on the user identification and a level of access assigned to the user identification and hide icons associated with icons that are unavailable based on the user identification and the level of access assigned to the user identification, wherein a function of the means for inputting relies on the level of access granted to a user, wherein the diagnostic computing device is configured to diagnose a vehicle related issue, wherein the diagnostic computing device is configured to limit external communication to receiving unidirectional communication including a signal from a remote device to lock out a user if verifying the user identification fails, and wherein the diagnostic computing device alerts the user of the diagnostic computing device if one of the plurality of security features of the diagnostic computing device has been disabled.

20. The system of claim 19, further comprising:
means for connecting configured to connect the diagnostic computing device to a network; and
means for receiving configured to receive the instructions via the network from the remote device.

* * * * *